United States Patent [19]
Castano

[11] Patent Number: 6,127,625
[45] Date of Patent: Oct. 3, 2000

[54] TRANSMISSION CONDUIT AND METHOD OF INSTALLATION OF SAME

[75] Inventor: Ruben Carlos Castano, Buenos Aires, Argentina

[73] Assignee: Professional Communications, S.A., Argentina

[21] Appl. No.: 09/061,595

[22] Filed: Apr. 16, 1998

[30] Foreign Application Priority Data

Apr. 18, 1997 [AR] Argentina ........................ 97 0101560
Dec. 10, 1997 [AR] Argentina ........................ 97 0101560

[51] Int. Cl.[7] ................................ H02G 7/00; H02G 7/20
[52] U.S. Cl. .......................... 174/40 R; 174/41; 174/43; 174/45 R
[58] Field of Search ................................. 174/40 R, 41, 174/43, 45 R, 99 R, 102 R, 102 A, 105 R, 105 B

[56] References Cited

U.S. PATENT DOCUMENTS

| | | | |
|---|---|---|---|
| 2,029,044 | 1/1936 | Westlinning | 228/130 |
| 3,360,409 | 12/1967 | Jachimowicz et al. | 174/107 |
| 3,629,489 | 12/1971 | Jachimowicz et al. | 174/107 |
| 4,795,856 | 1/1989 | Farmer | 174/40 R |
| 5,468,913 | 11/1995 | Seaman et al. | 174/102 R |
| 5,758,005 | 5/1998 | Yoshida | 385/136 |

*Primary Examiner*—Kristine Kincaid
*Assistant Examiner*—Mark Olds
*Attorney, Agent, or Firm*—David B. Abel, Esq.; Graham & James LLP

[57] ABSTRACT

A tubular channeling unit including a grounded external metal sheathing and an internal longitudinal cavity, and method for laying such a tubular channeling unit by suspension on a high voltage aerial power line system including at least two towers supporting a set of high voltage electrical conductors suspended from the towers at a specified height above the ground and at a minimum predetermined safety level.

21 Claims, 3 Drawing Sheets

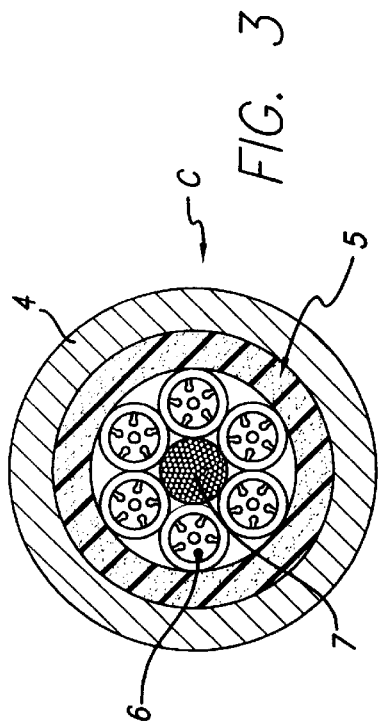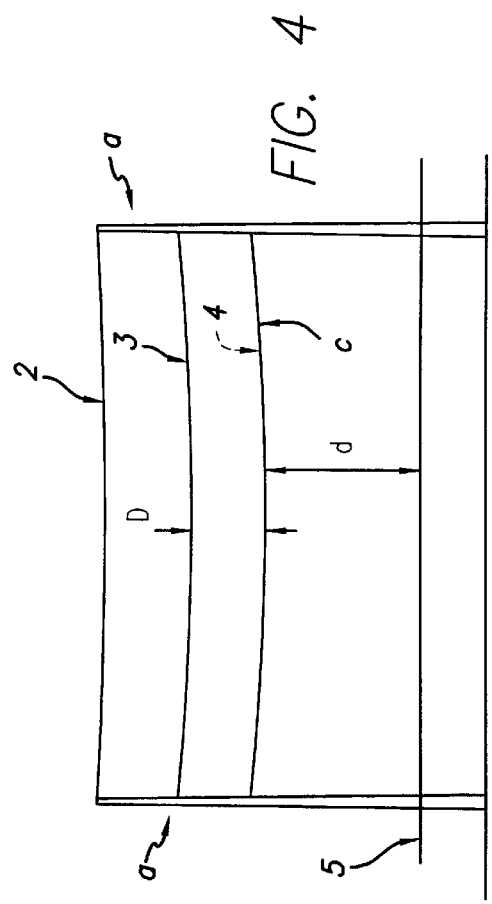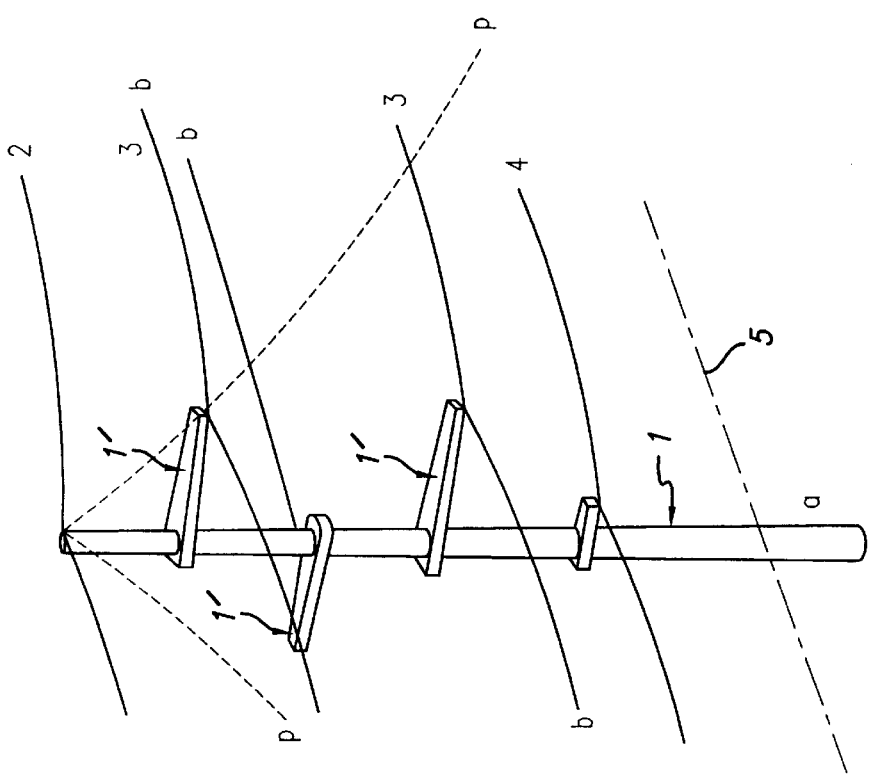

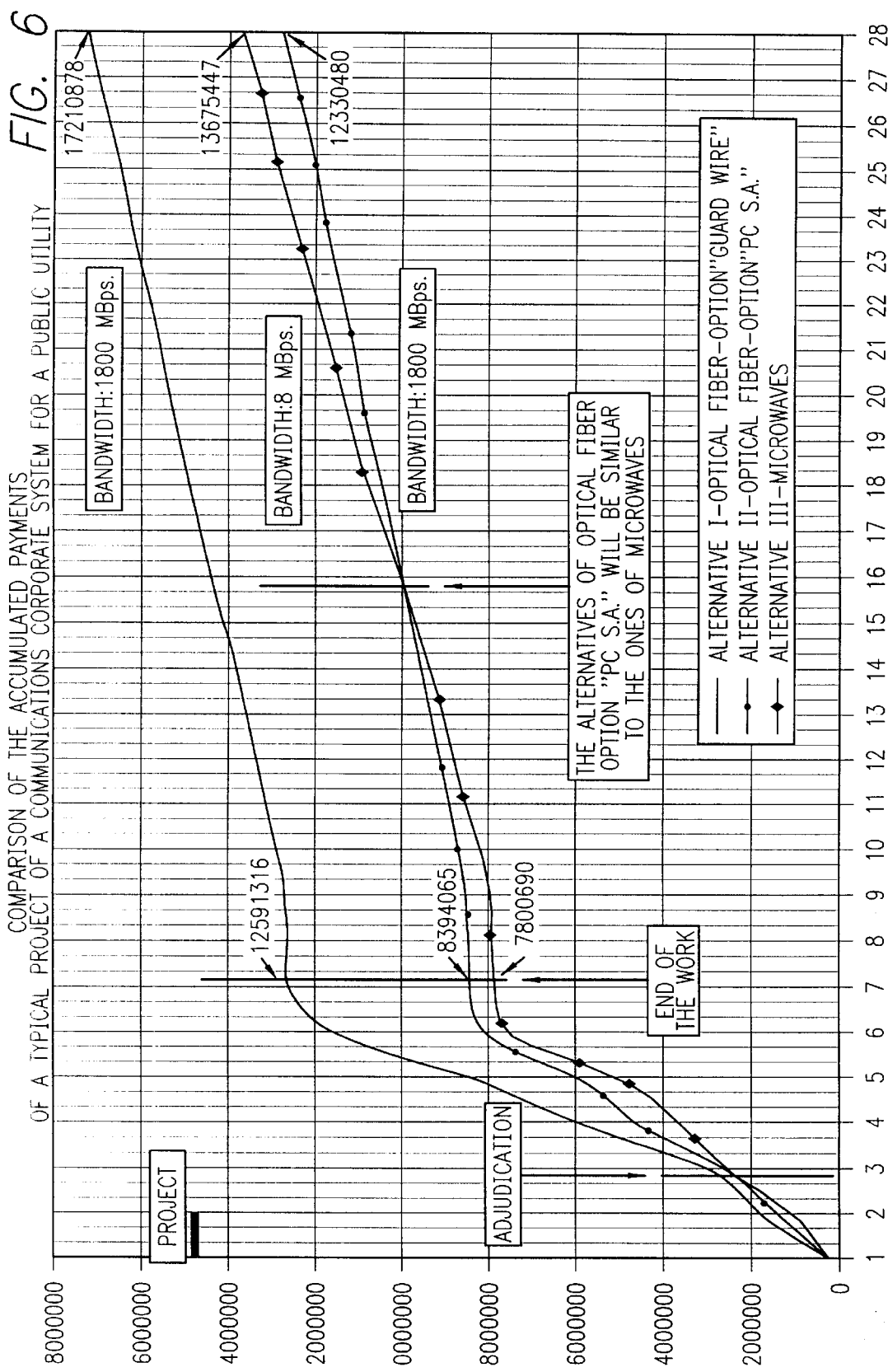

TRANSMISSION CONDUIT AND METHOD OF INSTALLATION OF SAME

BACKGROUND OF THE INVENTION

1. Field of the Invention

The invention relates to a new concept for the laying of transmission, conduction and communication lines, and particularly, it refers to improvements in the laying of channelizing lines for applications such as signal transmission, energy and fluid conduction and other purposes.

Though in principle, the invention has been particularly developed for its application in the laying of optical fibers, in practice, the new channelizing unit may be applied to other transmission, conduction and communication applications which are compatible with the cavity of a specially designed tubular channelizing structure. In order to simplify the description herein, the specification will be directed to the laying of optical fibers. It is to be understood, however, that the same concepts or similar concepts may be applied to other types of signal or power transmission lines and the conduction of fluids generally.

2. Description of Related Art

The transmission over large distances of communication signals or electrical power and related applications, may be carried out by the installation or "laying" of cables. The laying is accomplished using any of the three known procedures: underground, underwater and aerial installation.

Underground installation consists of burying the cables lodged in pipes and hermetic sheaths. This method has several inconveniences, such as the high installation and operating costs particularly when it is necessary to make repairs or modifications in the network forcing the continuous excavation and covering of ditches. At the same time, underground installation may become dangerous, generally because the cables are not visible and might be cut or damaged during excavations.

Underwater installation is accomplished through the laying of submarine cables or of cables which lie in the bed of rivers and lakes. It is yet a more expensive technology than the underground method discussed above, as it requires laying at very deep depths in order to avoid accidents caused by large ships or other aquatic transportation systems. Further, the cables must be provided with hermetic sheaths of great resistance to the hydraulic pressures and to the degradation produced by the underwater environment.

Aerial installation is accomplished through the use of poles, towers or other supports which hold in place the cables and which are arranged at a certain distance from the ground level, designated as the "safety level." The access to an aerial system is easier and quicker, making possible the direct repairs and modifications of the network and of its connections. The laying of optical fibers on high voltage overhead lines would allow the set up of a communications network of high quality, using the towers of preexistent electrical networks and their right-of-way, with a noticeably lower cost than the cost of an underground installation. The aerial laying may be carried out utilizing the following techniques:

Laying Over High Voltage Conductors

The tower suspended, high voltage power line systems generally include at the upper part of the tower at least one metallic cable designated as being a security cable or "guard wire". The aim of this security cable is to protect the high voltage network and its supporting structures from possible atmosphere electric discharges such as lighting. The determination of the characteristics of such a cable are governed by two main conditions:

Structural requirements, taking into account the span length, or the distance between towers, and the action of the wind, ice and snow loads.

Electric requirements, taking into account the short-circuit current and the potential maximum current pulse of a lightning strike.

For the laying of optical fibers, one of the known methods contemplates replacing the guard wire with a specially designed combination of a cable and optical fibers. In this apparatus, the cable performs the function of the guard wire and supports the optical fibers, simultaneously.

At present, with respect to the installation method for such a combination cable/optical fiber assembly, there are three options. First, installation on un-energized lines. When a new power line system is installed, the cable/optical fiber is incorporated during the procedure of the high voltage line installation.

Second, for the installation to be carried out on an operational preexistent power line system, to replace the guard wire with a combination cable/optical fiber, it is necessary to disconnect the electric supply to carry out the installation. This situation involves an economic loss due to the stoppage of the electric service, and to the corresponding payments for such service.

Third, installation with the lines energized on an operational preexistent power line system. In order to avoid inconveniences caused by the interruptions in the services, special installation techniques must be used which allow the laying of combination guard wire cable/optical fibers with the high voltage lines energized. These methods are more expensive and slower, and involve higher risks to workers installing the cables.

Laying below the high voltage conductors may be possible using a cable made up of dielectric materials, which protect and support the optical fibers when they are laid below the energized conductors. This method makes possible installation with the energized lines at a lower cost, with less interruptions in the service and with a lower load on the towers by the effects of the wind due to the lower height at which the cable is held.

In order to support the cable, there exist two options. First, a dielectric cable may be self-supported using a central core of aramidic fiber such as the product sold by the DuPont corporation under the tradename "KEVLAR," to support the mechanical stress. Support may also be provided by a "messenger cable" of aramidic fiber which supports the dielectric cable which contains the optical fibers.

In either of these options, the cable design must take into account the structural requirements, the function of the length of the span (or distance between the towers), and the action of the loads caused by atmospheric factors (wind, ice and snow). Nevertheless, the use of dielectric materials on the sheath of the optical cable makes it necessary to take into account, particularly, the environmental conditions, which generate the following inconveniences:

(a) Degradation of the dielectric sheath of the cable by electromagnetic effects which has forced the use of the method only on lines of the same voltages or lower than 66 KV, or in aerial lines with middle and high tension superior to 50 KV.

(b) Degradation of the external sheath due to the environmental conditions, the action of the wind, erosion, solar radiation, rain and ice, etc.

(c) Degradation of the external sheath due to the effect of the regional fauna such as mainly, the birds which sit on or peck the sheath.

On the other hand, the existence of structural limitations due to the cable design, or its use in spans superior to 100 m, has not been allowed in layings with spans superior to 150 m.

BRIEF SUMMARY OF THE PRESENT INVENTION

The invention referred to in the present document has solved the problems raised by prior installation systems and apparatus in a very easy and ingenious way. The method and apparatus contemplate the laying of a cable within a grounded tubular metallic sheath, which sheath may carry inside the optical fibers, and which can be secured to the power line structures within a zone defined at its lower limit by the standardized security limit or safety level for each zone, and inside the protected area defined at its upper limit by the guard wire.

This technological development, though the simplicity of its features offers the following advantages.

First, it simplifies noticeably the installation of the optical cable on towers having energized lines.

Second, it minimizes the necessity of the programmed cuts.

Third, it is easily handled during installation, service and repair.

Fourth, it offers an appropriate protection to the optical fibers against the electromagnetic and environmental effects, extending the useful life of the cable.

Fifth, it places a smaller load on the towers in comparison with a laying on top of the structure, due to a smaller lever arm.

Sixth, it diminishes the electrical requirements of the cable, since it doesn't act as the guard wire.

Seventh, it allows the designer a greater freedom for the choice of the mechanical parameters of the cable, reducing noticeably the costs, for example, making possible the use of smaller sections and optimizing the design for different lengths.

Eighth, it separates the mechanical requirements from the electrical ones, this makes it possible to improve the cable design, reducing noticeably its costs and simplifying the installation.

In order to better understand the great impact that the new cable laying system has on the reduction of the acquisition and operating costs, in comparison with the traditional techniques, FIG. 6 is a graphic representation of an installation cost analysis.

BRIEF DESCRIPTION OF THE DRAWINGS

For a better clarity and comprehension of the method and apparatus of this invention, it is illustrated with different drawings in which it has been represented in one of its preferred embodiments to be understood as an illustrative example.

FIG. 2 is a schematic detail of the tower, which has been marked to illustrate the zone where the new tubular channeling unit is laid;

FIG. 3 is a cross section of the new tubular channeling unit, showing the tubular shape of its metal sheathing, the layers that form it and the channel defined therein, that in this embodiment corresponds to a set of cables of optical fibers;

FIG. 4 is a schematic of two towers where it is shown the installation of the new tubular channeling unit, with reference to the safety or security level about the ground, and one of the high voltage cables;

FIG. 5 is a side perspective view of the tubular channeling unit in accordance with an embodiment that illustrates an optional external carrier.

FIG. 6 is a graphic representation of an intallation cost analysis.

DETAILED DESCRIPTION OF THE PREFERRED EMBODIMENT

Figure 1:
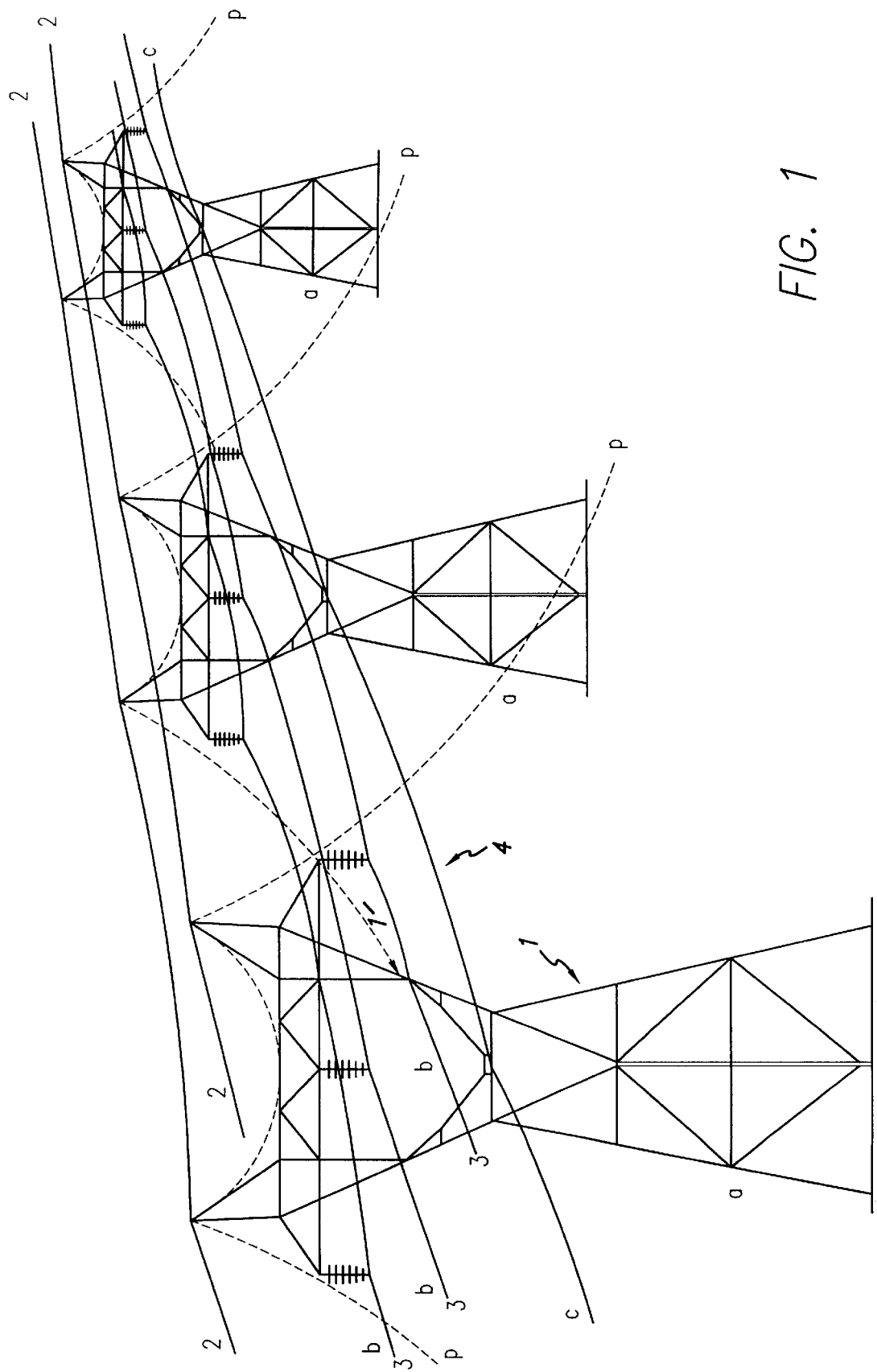
FIG. 1 is a view in perspective corresponding to a supporting tower of high voltage lines, on which may be seen the laying of the new tubular channeling unit.

In the figures it may be observed that the following distances are kept: first, the minimum distance (D) between a low voltage cable and the tubular channeling unit, whatever the lags that one or the other may present in the laying; and second, the minimum distance (d) between the tubular channeling unit and the safety limit (safety level), that the regional rules or the rules of each country state with respect to the ground, the electrical and mechanical minimum distances to the energized conductors, as well as the location of the tubular channeling unit inside the protected zone defined by the guard wire.

In the different figures, the same reference numbers indicate the equivalent or corresponding parts, and the assemblies of various elements have been marked with the following designations.

List of the Main References (a) Support tower
(b) High voltage cables
(c) Tubular channeling unit
(s) Security level
(p) Limit of the protected zone by the guard wire
(1) Tower columns of (a)
(1') Tower arms of (a)
(2) Guard wire
(3) High voltage conductors laid at a lower height
(4) External metal sheathing of (c)
(5) Aluminum pipe
(6) Optical fiber cables
(7) Dielectric core Taking into account the aims defined, the improvements in the laying of channelizing lines for various applications, such as signal transmission, energy and fluid conduction and other purposes; of the type that use high voltage aerial line systems mainly formed by support towers (a) having a set of high voltage conductors (b), which, at the top include a guard wire (2) laid among such towers (a). The set of high voltage conductors (b) are laid among the towers (a) at a certain distance from the ground, arranged over the predetermined level (s); and then, in a zone delimited at the lower side by such level (s) and inside the guard wire protection zone (p), along all the distance among the towers, it is arranged a tubular channeling unit (c), that, laid among the same towers (a), has a grounded external metal sheathing (4), forming an internal longitudinal cavity, that forms the channeling unit for the various applications such as optical fiber cables (6).

The invention consists of a lengthened tubular channeling unit (c) having special features, which is laid in a special zone of the towers (a) that supports the high voltage lines (b), without damaging or altering their structures, and without changing the guard wire (2) arranged in the highest zone of such towers (a).

For new high voltages installations, the laying of the lengthened tubular channeling unit (c), is made possible during the arrangement of the towers (a) without the system being energized.

By comparison, if it is applied to preexistent installations, the laying of the new cable may be undertaken with the network energized, without the necessity of making cuts in the power line transmission of the installation.

Specifically, the tubular channeling unit (c) consists of the external metal sheathing (4), for example, of iron, that sheathes or coats an aluminum pipe (5), with a longitudinal cavity defined within this pipe (5), which is prepared to channel through it transmission application apparatus such as communication lines, signal transmission lines, energy conductors, liquids or gaseous fluids or any of the other applications mentioned above.

In a preferred but not restrictive embodiment, the longitudinal cavity of the aluminum pipe (5), provides a channel for optical fiber cables (6) with their correspondent sheaths, arranged around a dielectric core (7) as shown in FIG. 3. By the presence of the external metal sheathing (4), made of iron and combined with the aluminum pipe (5), the new cable becomes self-supporting, with the characteristic that its external sheath (4) is not degradable by the ionic or the environmental effects, the action of the wind, erosion, ultra-violet radiation, rain or hydro-meteors, birds, rodents, insects, etc.

The tubular channeling unit (c), is held or secured through installation accessories which will secure the tubular channeling unit to an appropriate ground, and it is laid among the same towers (a), preferably in their columns (1) in a zone delimited at the lower side by the security level stated by the current general or zonal law, and inside the protected zone by the guard wire (p), and respecting the minimum electric and mechanical distances along the extension of the span as depicted in FIG. 4.

It has been contemplated that the external sheath may be formed of a metallic tube, a tubular metallic mesh, a hollow metallic helicoidal cable, or some similar appropriate configuration.

The tubular channeling unit of the metallic sheath may have an external carrier for example, through the supply of an occluded cable 9 along a longitudinal salient defining a FIG. "8" shape on the metallic sheath. The tubular channeling unit may have an internal carrier such as an extended cable along the cavity as a core. Further, the metal sheathing (4) may be formed of iron, steel, copper or any other appropriate metal.

For each line installation, in particular, this new apparatus and method allows the designer to take into account or to consider the following concepts: the minimum separation of the tubular channeling unit (c) with respect to the nearest energized conductors (3) along all the span among towers (a); the security regulations, the losses due the parasitic current, the unexpected line impedance modification; and the effects of the ice and snow gathering, and the birds on the lines.

From the structural and electric point of view, it will allow the selection of the type of installation accessory to use, and also the best fastening point on the tower structure (a).

When applied to preexistent towers (a), consideration of their structure design and the foundations with respect to the additional load due to the metal sheathing (4) of the tubular channeling unit (c).

The minimum height of the optical cable with respect to the ground, in order to accomplish the regulating requirements, in particular with respect to the crossing over of lines with roads and other electric lines, may also be accounted for.

The designer will also be able to take into account the requirements of grounding for the different types of structures used. Finally, the designer will have to verify that the tubular channeling unit will be inside of the protection zone of the guard wire (p).

Certainly, when this invention begins to be used, it will be able to be modified with respect to certain construction and shape details. But this will not mean to leave the fundamentals ideas which are exposed in the appended claims.

What is claimed is:

1. A transmission conduit apparatus for installation on a high voltage aerial power line system including at least two towers supporting a set of high voltage electrical conductors suspended from the towers at a specified height above the ground at a minimum predetermined safety level, the at least two towers also being interconnected by a guard wire installed between the towers, the transmission conduit apparatus comprising:

a tubular channeling unit including a grounded external metal sheathing and an internal longitudinal cavity, said tubular channeling unit being attached to said at least two towers so as to be suspended in a zone delimited between the safety level and below the top of an area protected by the guard wire.

2. The apparatus in accordance with claim 1 wherein the external metal sheathing is a metallic tubular wall and the tubular channeling unit further includes at least one pipe mounted within said metal sheathing, said at least one pipe defining a channelizing cavity.

3. The apparatus in accordance with the claim 1, wherein the external metal sheathing is a steel tubular wall that sheaths at least one aluminum pipe that forms a channelizing cavity.

4. The apparatus in accordance with the claim 1, wherein the external metal sheathing is a metallic tubular mesh that sheaths at least one pipe that forms a channelizing cavity.

5. The apparatus in accordance with the claim 1, wherein the external metal sheathing is a hollow helicoidal cable that sheaths at least one aluminum pipe that forms a channelizing cavity.

6. The apparatus in accordance with the claim 1, further comprising:

a plurality of transmission lines for optical signals mounted within and extending through said tubular channeling unit.

7. The apparatus in accordance with the claim 1, further comprising:

transmission lines for electromagnetic signals mounted within and extending through said tubular channeling unit.

8. The apparatus in accordance with the claim 1, further comprising:

a plurality of optical fiber cables mounted within and extending through said tubular channeling unit.

9. The apparatus in accordance with the claim 1, further comprising:

at least one electric cable mounted within and extending through said tubular channeling unit.

10. The apparatus in accordance with the claim 1, further comprising:

a plurality of telephone cables mounted within and extending through said tubular channeling unit.

11. The apparatus in accordance with the claim 1, further comprising:

a plurality of coaxial cables mounted within and extending through said tubular channeling unit.

12. The apparatus in accordance with the claim 1, further comprising:

several twisted pairs of cables for the transmission of signals in communication systems mounted within and extending through said tubular channeling unit.

13. The apparatus in accordance with the claim 1, wherein the tubular channeling unit is suitable for allowing the contained transmission of fluids.

14. The apparatus in accordance with the claim 1, wherein the tubular channeling unit is suitable for allowing the contained transmission of fluids in gaseous and liquid phases.

15. The apparatus in accordance with the claim 1, wherein said tubular channeling unit further comprises a supporting element.

16. The apparatus in accordance with the claim 15, wherein the supporting element is mounted within said external metal sheathing.

17. The apparatus in accordance with the claim 15, wherein the tubular channeling unit is self-supporting through its own external metal sheathing.

18. The apparatus in accordance with the claim 15, wherein said supporting element is affixed externally to said external metal sheathing.

19. The apparatus in accordance with the claim 18, wherein the supporting element is a cable located along a longitudinal protrusion of the metal sheathing.

20. The apparatus in accordance with the claim 19, wherein the supporting element is a steel cable which forms a core around which optical fiber cables are arranged.

21. A method of laying a transmission conduit apparatus by suspension on a high voltage aerial power line system including at least two towers supporting a set of high voltage electrical conductors suspended from the towers at a specified height above the ground in excess of the minimum predetermined safety level, the at least two towers also being interconnected by a guard wire installed between the towers, the method of laying the transmission conduit apparatus comprising:

providing a tubular channeling unit including a grounded external metal sheathing and an internal longitudinal cavity; and attaching said tubular channeling unit to said at least two towers so as to suspend said tubular channeling unit in a zone delimited between the safety level and the upper boundary of an area protected by the guard wire at the upper height.

* * * * *